Feb. 26, 1935.  E. MARX  1,992,829
RECTIFYING DEVICE
Filed April 14, 1930   3 Sheets-Sheet 1

Feb. 26, 1935.   E. MARX   1,992,829
RECTIFYING DEVICE
Filed April 14, 1930   3 Sheets-Sheet 2

Inventor:
Erwin Marx
by ...
Atty.

Feb. 26, 1935.   E. MARX   1,992,829
RECTIFYING DEVICE
Filed April 14, 1930   3 Sheets-Sheet 3

Inventor:
Erwin Marx,
by Charles V. Tullar
His Attorney.

Patented Feb. 26, 1935

1,992,829

UNITED STATES PATENT OFFICE 1,992,829

RECTIFYING DEVICE

Erwin Marx, Brunswick, Germany, assignor to General Electric Company, Schenectady, N. Y., a corporation of New York Application April 14, 1930, Serial No. 444,123
In Germany April 18, 1929

23 Claims. (Cl. 175—363)

My invention refers to rectifying devices and more particularly to devices for rectifying high alternating voltages. For this purpose hitherto glow cathode rectifiers or mechanical rotating or vibrating rectifiers have been used. Efforts have also been made to use the great difference of the spark-over voltage between electrodes with a very inhomogenous and unsymmetrical field for rectifying high voltages. However, these devices have proved unfit for practical use.

It is an object of my invention to provide a rectifying device which allows rectifying high alternating voltages in a reliable manner. According to my invention this is accomplished by connecting two rectifying devices in series and connecting the wire connecting the two rectifiers to ground by means of a high impedance, for instance a high ohmic resistance.

It is a specific object of my invention to provide a new and improved system whereby direct current may be converted into alternating current.

Figure 1:
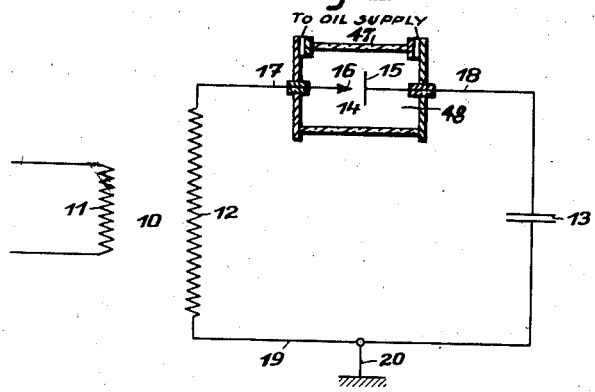

Further objects of my invention will appear from the following description in connection with the drawings affixed to this specification and forming part thereof, in which Fig. 1 is an explanatory diagram, while Figs. 2, 3, 4, 5 and 6 are diagrams showing various embodiments of my invention.

Referring first to Fig. 1, 10 is a transformer, the primary 11 of which is connected to the alternating voltage line (not shown). The secondary 12 is connected to a condenser 13, a spark gap 14 being inserted between the secondary and the condenser. The spark gap 14 has a flat electrode 15 and a pointed electrode 16. 17 and 18 are the connections leading from the spark gap electrodes to the secondary 12 and to the condenser 13, respectively. The other terminal of the secondary winding 12 and the condenser 13 are connected by a wire 19 which is connected to ground at an intermediate point of its length by means of a connection 20. The device so far described is well known in the art and operates as follows:

When the voltage in the secondary winding increases, a flash-over between the electrodes 16 and 15 of the spark gap 14 will occur, if 16 has a positive potential. The condenser 13 will now be charged, so that the spark gap electrode 15 and the connection 18 have positive potentials. The flash-over between the electrodes of the spark gap 14 comes to an end, when the condenser 13 is fully charged and thereafter the connection 18 remains at positive potential. If the connection 17 becomes negative, no flash-over from 15 to 16 must occur since this would back-discharge the condenser 13.

This device involves the drawback that a flashover from 16 to 15 cannot occur until the condenser 13 is substantially fully discharged. If the alternating voltage is substantially increased beyond the value necessary for a flash-over in the spark gap 14, a flash-over may occur from 15 to 16, if 16 has negative potential. Therefore the rectifying valve must operate in the direction from 16 to 15 before the alternating voltage has reached its maximum value $u_m$, while if the condenser 13 is charged, the spark gap 14 must withstand the voltage $2 \times u_m$ in the direction from 15 to 16 without allowing a substantial current to pass. Therefore in order to prevent back-discharges the "stop voltage" of the valve must be at least twice the "operating voltage". As in many valves, for instance spark gaps with inhomogenous field, this condition is not realized with sufficient reliability, a commercial use of these devices was not possible hitherto.

Figure 2:
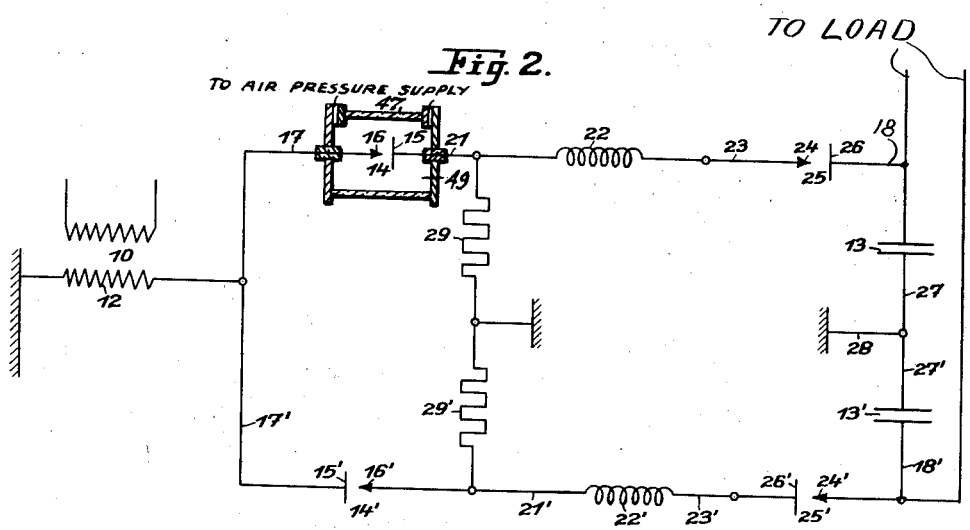

Referring now to Fig. 2, in order to avoid this draw-back, instead of the single spark gap or electric valve 14 two electric valves are connected in series by a suitable means and from a suitable point in the connection means between these two valves connection is made to ground by means of a high ohmic resistance. In the device shown in Fig. 2 both half waves of the secondary alternating voltage of a transformer are utilized. In Fig. 2, 10 is the transformer, the secondary winding 12 of which is connected at one terminal to ground and at the other to an electric circuit hereinafter described. The circuit comprises two halves, the upper half containing a connection 17 connected to the pointed electrode 16 of a spark gap 14, the flat electrode 15 of which is connected by means of a connection 21 to the inductance 22 which is connected by a connection 23 to the pointed electrode 24 of a second spark gap 25, the flat electrode 26 of which is connected by means of a connection 18 to a condenser 13 which is connected to ground by means of connections 27 and 28. 29 is a high ohmic resistance connecting the connection 21 to ground. The lower half of the circuit is formed in an analogous manner and consists of a connection 17' connecting the secondary winding 12 of the transformer to the flat electrode 15' of a spark gap 14', the pointed electrode 16' of which is connected by means of a connection 21' to inductances 22' which is connected by means of a connection 23' to the flat electrode 26' of a spark gap 25', the pointed electrode 24' of which is connected by means of a connection 18' to a condenser 13' which is connected by means of a connection 27' to the connection 28 which is connected to ground. 29' is a high ohmic resistance connecting the connection 21' to ground. A direct current load circuit is connected between the connections 18 and 18'.

The operation of this device is as follows:

The terminal 16 of the spark gap 14 is connected with the alternating voltage while, at first the electrode 15 has ground potential. When the voltage difference between the electrodes 15 and 16 is increased to a sufficient value, a flash-over occurs, when the electrode 16 is positive. Hereby the connection 21, inductance 22, connection 23 and electrode 24 of the spark gap 25 are charged positively. The resistance 29 is so high that no substantial current flows to ground. Since the electrode 26 of the spark gap 25 has at first ground potential, a flash-over occurs in the spark gap 25, provided that the distance between the electrodes of the spark gap 25 is the same as or less than the distance between the electrodes of the spark gap 14, and therefore the condenser 13 is charged. When the flash-overs in the spark gaps 14 and 25 have come to an end, the capacitance charges of the connections 21, 23 and the inductance 22 are drained off to ground through the resistance 29 in not more than 1/100 second. In consequence thereof, if connection 17 and electrode 16 become negative, the voltage difference between the electrodes 15 and 16 corresponds merely to the difference between the negative maximum value of the alternating voltage and ground potential. This follows from the fact that electrode 15 has been grounded through resistance 29. The voltage difference between the electrodes 24 and 26 corresponds to the difference between the positive maximum value of the alternating voltage and ground potential since electrode 24 has also been grounded through resistance 29. Therefore the maximum voltage difference between the connections 17 and 18 is divided by means of the resistance 29 in two equal portions. The spark gaps need not withstand the double operating voltage.

The condenser 13' is loaded by means of the spark gaps 14' and 25', but with reversed polarity, so that between the connections 18 and 18' is produced a voltage difference $2 \times U \sqrt{2}$, in which U is the R. M. S. secondary voltage of the transformer 10.

Figure 5:
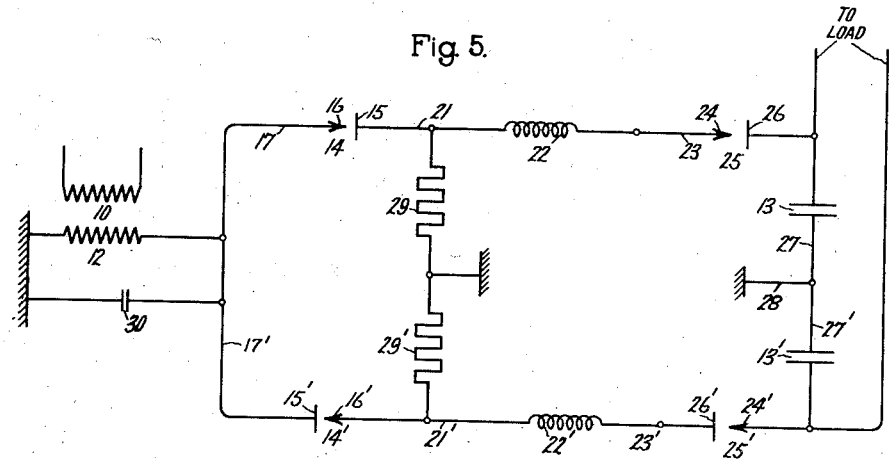

As shown in Fig. 5, in the event that a high direct voltage output is desired, a capacity 30 may be connected in parallel to the secondary winding 12 of the transformer 10, whereby the voltage drops in the spark gaps are substantially lowered. Except for the capacity 30 the system shown in Fig. 5 is the same as that shown in Fig. 2.

Resistances or inductances may be inserted in the connections 18 or 18' for smoothing the voltage variations occurring in the condensers 13 and 13', respectively.

The function of the inductances 22 and 22' inserted between the connections 21 and 23, or 21' and 23', respectively, is as follows:

A flash-over at the spark gap 25 will occur only if the potential of the connection 23 is substantially higher than the potential of the connection 18; therefore the direct voltage produced varies considerably. By the inductance 22, which may be replaced by a very long line, the voltage wave travelling into the connection 23, after a flash-over at 14 has occurred, is reflected nearly to its double amplitude and therefore a flash-over will occur at 25 even if the potential of the connection 18 has not substantially dropped. The travelling wave will be reflected to its double amplitude the more readily, the steeper the wave front. Therefore it is sometimes preferable to use a spark gap with a low discharge retardation, instead of a spark gap comprising a pointed and a flat electrode. Further the spark gap 14 may be inserted in a vessel containing oil or air under pressure, as shown in Figs. 1 and 2 respectively, the electrodes 15, 16 being enclosed in a vessel 47 connected to a suitable oil supply or air pressure supply and filled either with oil 48 or air 49 under pressure. Or a small capacity may be connected in parallel to the spark gap 14 in order to produce the flash-over as suddenly as possible and to lower the voltage drop in the spark gap 14. Sometimes the same means may be used with advantage in connection with the spark gap 25.

Figure 3:
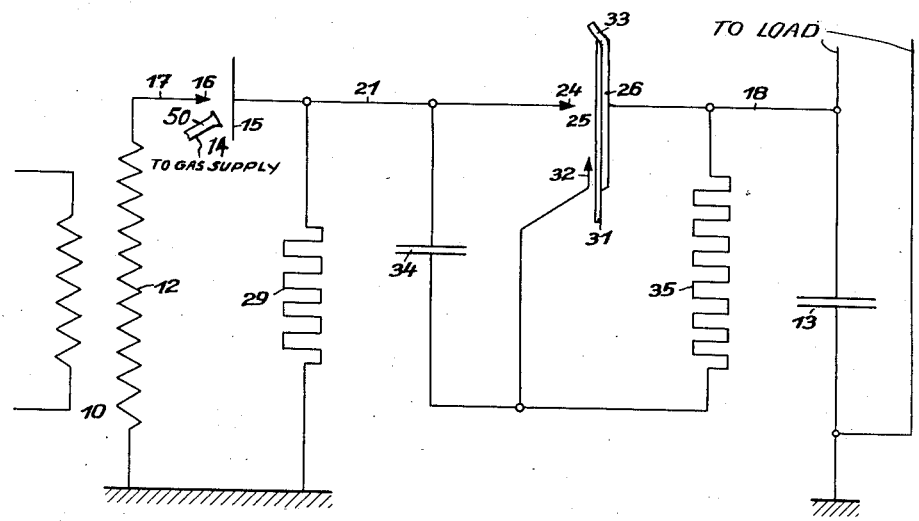

Referring now to Fig. 3, 10 is the transformer, the secondary winding 12 of which is connected to ground and, by means of the connection 17, to the spark gap 14 comprising terminals 16 and 15, the latter being connected by means of a connection 21 to the spark gap 25 comprising electrodes 24 and 26, which latter is connected by means of the connection 18 to the condenser 13 which is connected to ground. 29 is a high ohmic resistance connecting the connection 21 to ground. A plate 31 of insulating material is attached to the flat electrode 26 of the spark gap 25. On the other side of the insulating plate 31 is attached an auxiliary electrode 32. The upper edge of the flat electrode 26 is bent over the insulating plate 31 at 33. 34 is a condenser connected to the connection 21 and to the auxiliary electrode 32. 35 is a resistance connecting the auxiliary electrode 32 to the connection 18. The purpose of this connection is to avoid variations of the direct voltage produced by the device. A direct current load circuit is connected between ground and connection 18. The operation of the device is as follows:

When a flash-over occurs in the spark gap 14, the condenser 34 produces a voltage impulse and sliding discharges between the auxiliary electrode 32 and the bent edge 33 of the flat electrode 26 of the spark gap 25. The sliding discharges cause a flash-over from the pointed electrode 24, whereafter the potential of the auxiliary electrode 32 is rendered equal to the potential of the connection 18 by means of the resistance 35, so that, when the next flash-over in the spark gap 14 occurs, the voltage of the auxiliary electrode 32 is increased in the same manner. Instead of voltage impulses high frequency oscillations or higher alternating voltages of small wattage may be imparted to the auxiliary electrode 32 over a resistance (not shown). The use of a higher alternating voltage is preferable, particularly if lower alternating voltages are to be converted by means of an air gap comprising a pointed and a flat electrode. At low voltages the polarity difference of the flash-over voltage of a spark gap comprising a pointed and a flat electrode is very small, so that conversion in this manner is possible only if an auxiliary voltage is used. The auxiliary electrode may consist of an insulating pipe with a conductor within the pipe. The air gaps 14 and 25 must be adjustable independently of each other.

Figure 6:
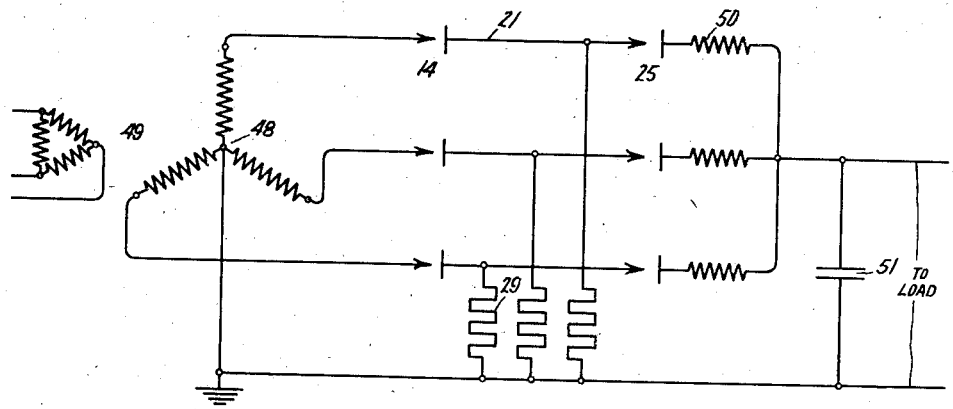

As shown in Fig. 6, my invention may be used for rectifying multi-phase voltages, two air gaps 14 and 25 being provided in each phase, the connection 21 between the pairs of gaps being grounded through the ohmic resistances 29 to the neutral point of the secondary winding 48 of a transformer 49. In order to prevent short circuits between the phases, impedance coils 50 may be inserted between the second air gap and the condenser 51 in each phase, whereby the voltage characteristic is smoothed also.

In the same manner two glow cathode valves or two mechanical rectifiers may be connected in series. Such rectifiers would not operate without a high ohmic resistance connecting the connection of the rectifiers to ground, as the voltage would be distributed to the valves in an unequal manner. By way of example, if two glow cathode valves are connected in series without providing a ground resistance, glow discharges will occur in the valve arranged next to the transformer which will prevent increasing the voltage substantially beyond the voltage which can be choked by means of a single glow cathode valve.

Figure 4:
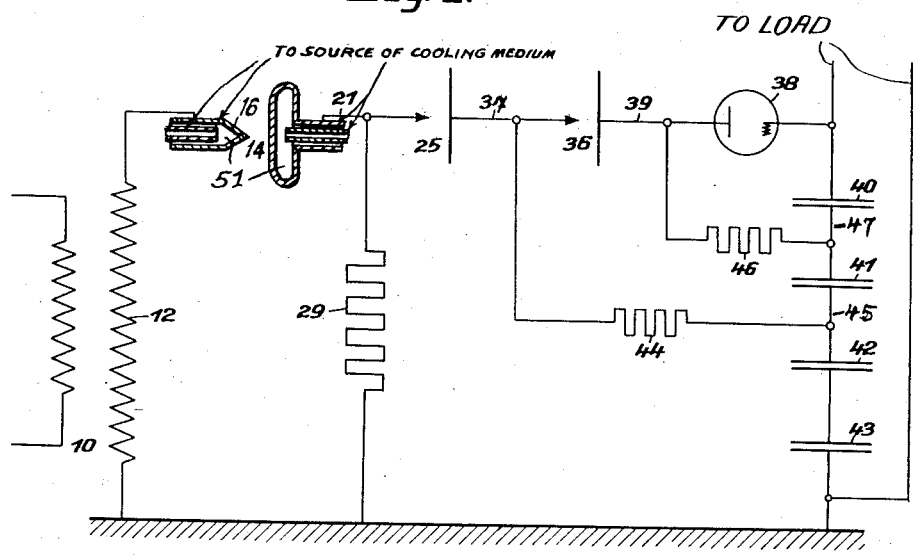

In Fig. 4 a device for rectifying extremely high direct voltages is shown. This device is adapted to produce a direct voltage of one million volts with very small voltage variations. The secondary 12 of the transformer 10 is connected to the spark gap 14, the latter being connected to the spark gap 25, the connection 21 of the spark gaps being connected to ground over a high ohmic resistance 29. The spark gap 25 is connected to a spark gap 36 by means of a connection 37, the spark gap 36 is connected to a valve tube 38 by means of a connection 39. 40, 41, 42, 43 are condensers connected in series between the valve tube 38 and ground. 44 is a resistance connecting the connection 37 to the connection 45 of the condensers 41 and 42, and 46 is a resistance connecting the connection 39 to the connection 47 of the condensers 40 and 41. A direct current load circuit is connected between ground and the connection betwen valve 38 and condenser 40. The spark gaps 14, 25 and 36 are adjusted in such manner that 25 operates at half the operating voltage as 14, and 36 at half the operating voltage as 25. The resistances 29, 44 and 46 define the voltage distribution at those periods where the spark gaps do not operate, so that a back discharge of the direct voltage is prevented, even when the alternating voltage has reached its negative maximum value. The valve 38 allows the current to pass momentarily if the potential of the cold electrode is higher than the potential of the heating filament. Instead of a valve tube a spark gap with or without an auxiliary electrode, as in Fig. 3, may be used.

The arrangement above described may be used for converting direct voltage into alternating voltage. The operation of the air gaps must be controlled corresponding to the period of the desired alternating voltage; instead of this the connection between the air gaps may be connected to an alternating voltage supply of small output by means of resistances.

In the event that the arcs in the air gaps do not extinguish, quench spark gaps may be connected in series or the arcs may be extinguished by blowing or cooling the gaps, as shown in Fig. 3, a stream of cooling gas being projected through a nozzle 50 against the electrodes 15, 16 from a suitable gas supply. A blow gas preventing an oxidizing of the electrodes may be used. The gas may be back-cooled. For high outputs cooled electrodes, particularly electrodes cooled by liquids, may be used, as shown in Fig. 4. In the latter figure the electrodes 15 and 16 are illustrated as hollow, a cooling medium 51 being supplied to the hollow electrodes from a suitable source.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In a rectifying system, a rectifying device comprising two rectifiers connected in series and a high impedance connecting the connection of said two rectifiers to ground, a load circuit, and means to impress voltages upon said load circuit from the second of said rectifying devices.

2. In a rectifying system, a rectifying device comprising two rectifiers connected in series and a high ohmic resistance connecting the connection of said two rectifiers to ground, a load circuit, and means to impress voltages upon said load circuit from the second of said rectifying devices.

3. In a rectifying system, a rectifying device comprising two rectifiers connected in series and a high inductance connecting the connection of said two rectifiers to ground, a load circuit, and means to impress voltages upon said load circuit from the second of said rectifying devices.

4. In a rectifying system, a rectifying device comprising two rectifiers connected in series, an inductance included in the connection between said rectifiers, and a high ohmic resistance connecting the connection of said two rectifiers to ground, a load circuit, and means to impress voltages from the second of said rectifying devices upon said circuit.

5. In a rectifying system, a rectifying device comprising two different rectifiers connected in series and a high impedance connecting the connection of said two rectifiers to ground, a load circuit, and means to impress voltages upon said load circuit from the second of said rectifying devices.

6. In a rectifying system, a rectifying device comprising two rectifiers connected in series and a high impedance, connecting the connection of said two rectifiers to ground, said impedance being dimensioned in such maner that the back voltage occurring on each rectifier exceeds only slightly the operating flash-over voltage of the rectifier, a load circuit, and means to impress voltages upon said load circuit from the second of said rectifying devices.

7. In a rectifying system, a rectifying device comprising two rectifiers connected in series, a high impedance connecting the connection of said two rectifiers to ground and an inductance inserted in the connection of said rectifiers, a load circuit, and means to impress voltages upon said load circuit from the second of said rectifying devices.

8. In a rectifying system, a rectifying device comprising two rectifiers connected in series, a high impedance connecting the connection of said two rectifiers to ground, and a long line connecting said rectifiers, a load circuit, and means to impress voltages upon said load circuit from the second of said rectifying devices.

9. In a rectifying system, a rectifying device comprising two rectifiers connected in series, an inductance inserted between said rectifiers and a high impedance connecting the connection of one rectifier and said inductance to ground, a load circuit, and means to impress voltages upon said load circuit from the second of said rectifying devices.

10. In a rectifying system, a rectifying device comprising a rectifier, a spark gap rectifier connected in series to said rectifier, a pointed electrode and a flat electrode in said spark gap rectifier and a high impedance connecting the connection of said rectifier and said spark gap rectifier to ground, a load circuit, and means to impress voltages from said spark gap rectifier upon said circuit.

11. In a rectifying system, a rectifying device comprising a rectifier, a spark gap rectifier connected in series to said rectifier, a pointed electrode and a flat electrode in said spark gap rectifier, an oil-filled vessel enclosing said spark gap rectifier and a high impedance connecting the connection of said rectifier and said spark gap rectifier to ground, a load circuit, and means to impress voltages from said spark gap rectifier upon said circuit.

12. In a rectifying system, a rectifying device comprising a rectifier, a spark gap rectifier connected in series to said rectifier, a pointed electrode and a flat electrode in said spark gap rectifier, a pressure-air-filled vessel enclosing said spark gap rectifier, and a high impedance connecting the connection of said rectifier and said spark gap rectifier to ground, a load circuit, and means to impress voltages from said spark gap rectifier upon said circuit.

13. In a rectifying system, a rectifying device comprising a rectifier, a spark gap rectifier connected in series to said rectifier, a pointed electrode and a flat electrode in said spark gap rectifier, a condenser connected in parallel to said spark gap rectifier, and a high impedance connecting the connection of said rectifier and said spark gap rectifier to ground, a load circuit, and means to impress voltages from said spark gap rectifier upon said circuit.

14. In combination a multiphase alternating current supply, two rectifying devices as claimed in claim 1 in each phase thereof, a load circuit, and means to impress voltages upon said circuit from the second of said rectifying devices in each of said phases.

15. In a rectifying system, a rectifying device comprising a plurality of rectifiers connected in series, connections between said rectifiers and means including a high impedance connecting at least one of said connections to ground for controlling the potentials of said connections in a predetermined manner, a load circuit, and means to impress voltages from the last rectifier of said series upon said circuit.

16. In a rectifying system, a rectifying device comprising a plurality of spark gap rectifiers connected in series, connections between said rectifiers and means including a high impedance connecting at least one of said connections to ground for controlling the potentials of said connections in a predetermined manner, a load circuit, and means to impress voltages from the last rectifier of said series upon said circuit.

17. In a rectifying system, a rectifying device comprising a rectifier, a spark gap rectifier connected in series to said rectifier, a pointed electrode and a flat electrode in said spark gap rectifier, a high impedance connecting the connection of said rectifier and said spark gap rectifier to ground, and means for controlling the flash over in said spark gap by means of an auxiliary voltage, a load circuit, and means to impress voltages from said spark gap rectifier upon said circuit.

18. In a rectifying system, a rectifying device comprising a rectifier, a spark gap rectifier connected in series to said rectifier, a pointed electrode and a flat electrode in said spark gap rectifier, a high impedance connecting the connection of said rectifier and said spark gap rectifier to ground, and means for directing a gas current against said spark gap electrodes, a load circuit, and means to impress voltages from said spark gap rectifier upon said circuit.

19. In a rectifying system, a rectifying device comprising a rectifier, a spark gap rectifier connected in series to said rectifier, a pointed electrode and a flat electrode in said spark gap rectifier, a high impedance connecting the connection of said rectifier and said spark gap rectifier to ground, and means for cooling said spark gap electrodes, a load circuit, and means to impress voltages from said spark gap rectifier upon said circuit.

20. In a rectifying system, a rectifying device comprising a rectifier, a spark gap rectifier connected in series to said rectifier, a pointed electrode and a flat electrode in said spark gap rectifier, said spark gap electrodes being cooled by a liquid, and a high impedance connecting the connection of said rectifier and said spark gap rectifier to ground, a load circuit, and means to impress voltages from said spark gap rectifier upon said circuit.

21. In a rectifying system, an alternating voltage transformer, a secondary winding in said transformer, a rectifying device as claimed in claim 1, said secondary winding being inserted between said rectifying device and ground, a condenser connected in parallel to said secondary winding, a load circuit, and means to impress voltages from the second of said rectifiers upon said circuit.

22. In a rectifying system, a device for converting direct voltages into alternating voltages comprising a plurality of spark gap rectifiers connected in series, an auxiliary alternating voltage supply and means for controlling the flash overs in said spark gaps by means of said supply, a load circuit, and means to impress voltages from the last rectifier of said series upon said circuit.

23. In a rectifying system, a device for converting direct voltages into alternating voltages comprising a plurality of spark gap rectifiers connected in series, connections between said spark gaps, an auxiliary alternating voltage supply and resistances inserted between said connections and said alternating voltage supply, a load circuit, and means to impress voltages from the last rectifier of said series upon said circuit.

ERWIN MARX.